(12) United States Patent
Melchiors et al.

(10) Patent No.: US 6,620,893 B1
(45) Date of Patent: Sep. 16, 2003

(54) METHOD OF PRODUCING OXIDATIVE DRYING URETHANE-MODIFIED POLYESTER DISPERSIONS AND THEIR USE

(75) Inventors: Martin Melchiors, Leichlingen (DE); Harald Blum, Leverkusen (DE); Karl-Ludwig Noble, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/958,774

(22) PCT Filed: Apr. 4, 2000

(86) PCT No.: PCT/EP00/02981

§ 371 (c)(1),
(2), (4) Date: Oct. 12, 2001

(87) PCT Pub. No.: WO00/63271

PCT Pub. Date: Oct. 26, 2000

(30) Foreign Application Priority Data

Apr. 16, 1999 (DE) .......................................... 199 17 161

(51) Int. Cl.$^7$ .............................................. C08G 63/21
(52) U.S. Cl. ..................... 525/440; 528/55; 528/295.5; 528/302; 528/306
(58) Field of Search ............................. 528/55, 295.5, 528/302, 306; 525/440

(56) References Cited

U.S. PATENT DOCUMENTS

| | | | |
|---|---|---|---|
| 3,412,054 A | 11/1968 | Milligan et al. .............. 260/18 |
| 5,004,779 A | 4/1991 | Blum et al. .................. 524/591 |
| 5,126,393 A | 6/1992 | Blum et al. .................. 524/538 |
| 5,280,062 A | 1/1994 | Blum et al. .................. 524/591 |
| 5,319,052 A | * 6/1994 | Prantl et al. |
| 6,187,384 B1 | 2/2001 | Wilke et al. ............. 427/388.4 |

FOREIGN PATENT DOCUMENTS

| | | |
|---|---|---|
| EP | 17 199 | 10/1980 |
| EP | 183 150 | 6/1986 |
| EP | 510 438 | 10/1992 |
| EP | 566 953 | 10/1993 |

OTHER PUBLICATIONS

*Database WPI, Week 9534, Derwent Publications Ltd., London, GB; AN 261323, XP002146054.

"Water type urethanated alkyd resin dispersion having a film forming component comprises a polyol cpd, organic diisocyanate and hydroxy: alkanoic acid" & JP 07 265855 A (Dainippon Ink & Chem), Jun. 27, 1995.

*Database WPI, Week 9521, Derwent Publication Lts., London, GB; AN 159183, XP002146055.

"Resin composition for water resistant coatings" & JP 07 08523 A (Dainippon Ink and Chem), Mar. 28, 1995.

* cited by examiner

Primary Examiner—Robert Dawson
Assistant Examiner—Kuo-Liang Peng
(74) Attorney, Agent, or Firm—Joseph C. Gil; Thomas W. Roy

(57) ABSTRACT

This invention relates to a method of producing urethane-modified air-drying polyester dispersions and to the use thereof in coating media.

6 Claims, No Drawings

METHOD OF PRODUCING OXIDATIVE DRYING URETHANE-MODIFIED POLYESTER DISPERSIONS AND THEIR USE

This invention relates to a method of producing urethane-modified air-drying polyester dispersions, and to the use thereof in coating media.

BACKGROUND OF THE INVENTION

It is known that polyhydroxy compounds, such as polyester or alkyd resins for example, can be converted into water-thinnable binder vehicles, which comprise an incorporated carboxyl group which is stable to saponification, by reaction with diisocyanates and with a compound which contains at least 2 groups which react with isocyanates and at least one group which is capable of forming anions.

Thus U.S. Pat. No. 3,412,054, for example, describes the use of 2,2-bis(hydroxy-methyl)propionic acid, as a compound which comprises 2 groups which react with isocyanate and a group which is capable of forming anions, for the production of aqueous polyurethane dispersions which contain drying fatty acids. The 2,2-bis(hydroxy-methyl) propioniic acid is incorporated by esterification, via its hydroxyl groups, into an alkyd resin and the latter is then reacted with diisocyanates. As stated in EP-A-0 017 199, this method results in non-uniform products which dry relatively slowly and which do not possess superior lacquer technology properties.

EP-A-0 017 199 describes oil-modified polyurethane dispersions which contain carboxyl groups and which exhibit improved properties. These dispersions are produced, for example, from the transesterification product formed from a natural oil and a polyol, e.g. soya oil and pentaerythritol, and a prepolymer which contains isocyanate groups, such as the reaction product of toluene diisocyanate and 2,2-bis (hydroxymethyl)propionic acid. The reaction is conducted in dilute solution in acetone. The acetone then has to be separated by distillation and replaced by organic so-solvents such as butyl glycol, for example, in order to obtain satisfactory stability on storage and good lacquer technology properties. The removal by distillation and repeated work-up of the acetone constitutes an undesirable industrial processing cost.

Conducting the urethane-forming reaction in the melt (melt dispersion method), as is described in DE-A-3 901 190, EP-A-0 427 028 or EP-A-0 498 156 for example, is an alternative procedure. The distillation step can in fact be circumvented in this manner. However, as is stated many times in the aforementioned documents, a very highly viscous molten resin is obtained. This results, particularly towards the end of the urethane-forming reaction and during dispersion, to massive mixing problems due to a lack of stirring power. The consequences are inhomogeneities in the molten resin, which result in variations in product quality. Moreover, caked deposits can be formed on colder parts of the reactor (e.g. in the condenser region), which are associated with a loss of yield, additional cleaning costs and safety hazards due to the poor dissipation of heat during the strongly exothermic urethane-forming reaction.

The underlying object of the present invention was therefore to eliminate the disadvantages of the prior art and to develop a simple, economic method of producing aqueous urethane-modified air-drying polyester dispersions and which are suitable for the production of high-quality covering lacquers. The object was firstly to avoid the use of costly, time-consuming processes, such as distillation steps for example, and was secondly to prevent the viscosity of the molten resin becoming too high during or after the completion of the urethane formation stage.

It has been found that aqueous urethane-modified air-drying polyester resins and which dry at room temperature to form lacquer films with a good level of lacquer technology properties can be produced, with a low melt viscosity during and after completion of the urethane-forming reaction, by the use of 3-hydroxy-2,2-dimethylpropionic acid (hydroxypivalic acid) as an agent which imparts hydrophilic properties.

Since, as a monohydroxy-functional carboxylic acid, hydroxypivalic acid acts as a chain terminator during the urethane-forming reaction, it must be considered surprising that good lacquer properties can be achieved with the binder vehicles of relatively low molecular weight which are obtained in this manner.

DE-A-19 534 361 describes aqueous binder vehicles which dry by oxidation and which contain a polyurethane-alkyd resin component based on special fatty acid mixtures. The use of hydroxypivalic acid as an agent which imparts hydrophilic properties is in fact mentioned there. However, DE-A-19 534 361 does not disclose any teaching with regard to how the viscosity problem described above could be solved by the use of hydroxypivalic acid. Rather, the description and the examples disclose the production of polyurethane-alkyd resin components which are rendered hydrophilic by 2,2-dimethylolalkanoic acids and which are produced using auxiliary organic solvents such as methyl ethyl ketone for example. These auxiliary solvents are subsequently removed by distillation.

SUMMARY OF THE INVENTION

The present invention therefore relates to a method of producing urethane-modified, aqueous polyester resins which dry by oxidation and which have an acid number of 15–50 mg KOH/g, characterised in that (all data in percentages are given in % by weight)
a) 15–40% of a prepolymer which is produced in situ and which consists of
   a1) a diisocyanate component consisting of at least one organic diisocyanate of molecular weight range 168–294, and
   a2) hydroxypivalic acid.
wherein the ratio of a1:a2 is selected corresponding to an equivalent ratio of NCO:OH=1:1 to 5:1,
is reacted in 80–95% organic solution with
b) 60–90% of a polyester resin with an OH number of 30–100 mg KOH/g and an acid number$\leq$5 mg KOH/g, produced by the reaction of
   b1) 20–70% of a monocarboxylic acid component, at least 60% of which consists of at least one unsaturated fatty acid,
   b2) 10–40% of a dicarboxylic acid, of a dicarboxylic anhydride or of a mixture of compounds such as these,
   b3) 0–15% of one or more diols and
   b4) 5–35% of one or more polyols with an OH-functionality>2, wherein b1, b2, b3 and b4 add up to 100%, and
c) 0–15% of one or more polyols with an OH-functionality$\geq$2,
wherein a, b and c add up to 100%, and are subsequently dispersed in water, and wherein the carboxyl groups which are introduced into the reaction product are converted into carboxylate groups by 0.5–1.2 equivalents (with respect to the carboxyl groups present) of a base during the reaction of (a+b+c) or directly before, during or after dispersion.

DETAILED DESCRIPTION OF THE INVENTION

The present invention also relates to the use of the aqueous binder vehicles which are produced in this manner in or as lacquers or coating materials which dry by oxidation crosslinking at room temperature.

Starting component a1 is a diisocyanate component consisting of at least one organic diisocyanate of molecular weight range 140 to 294. Examples of suitable diisocyanates include hexamethylene diisocyanate (HDI), 1-isocyanato-3,3,5-trimethyl-5-isocyanatomethylcyclohexane (IPDI), bis-(4-isocyanato-cyclohexyl)-methane ($H_{12}MDI$), 1-isocyanato-1-methyl-4(3)-isocyanatomethylcyclohexane (IMCI), toluene 2,4-diisocyanate, toluene 2,6-diusocyanate, 2,2,4-trimethyl-hexamethylene-1,6-diisocyanate, naphthalene diisocyanate and other isocyanates such as those described, for example, in Houben-Weyl, Methoden der organischen Chemie, Volume 14/2. 4th Edition, G. Thieme Verlag, Stuttgart 1963, pages 61–70.

Component a1 is converted to an NCO-functional prepolymer by using hydroxypivalic acid (component a2) in an equivalent ratio of NCO:OH ranging from 1:1 to 5:1, preferably from 1.8:1 to 3:1, most preferably from 2:1 to 2.5:1. The reaction can be carried out in the absence of solvent or in part of or in the complete amount of the organic solvent which is present during the urethane-forming reaction and which subsequently remains as a co-solvent in the aqueous binder vehicle dispersion. It is also possible to employ auxiliary solvents a this point: these auxiliary solvents have to be removed again, e.g. by distillation, at a later time during the synthesis.

The reaction takes place at temperatures between 0° and 150° C., preferably between 30° and 100° C. Customary catalysts which are used for the formation of urethanes can also be used, e.g. tertiary amines, organotin compounds or other organometallic compounds. The stabilisers which are known from isocyanate chemistry, e.g. acid halides such as isophthaloyl dichloride, can be used to prevent or suppress secondary reactions, such as trimerisation or the formation of allophanates for example.

The NCO-functional prepolymer a can be produced in any suitable reaction vessel, from which it is taken off and is subsequently added in the desired amount to components b and c during the production of the binder vehicles according to the invention. However, component a can also be produced directly in situ in the reaction vessel in which the reaction of a+b+c occurs to form the polyurethane. In this situation, prepolymer a is brought to the desired temperature of reaction after the completion of the reaction between a1 and a2, and components b and c are then added thereto.

Component b according to the invention is a polyester resin which contains fatty acids and which has an OH number ranging from 30–100 mg KOH/g and an acid number $\leq$5 mg KOH/g. It is produced by the reaction of starting components b1 to b4, which is known in the art, optionally assisted by customary esterification catalysts and preferably based on the principle of melt- or azeotropic condensation at temperatures from 80°–240° C. with the separation of water. In the case of azeotropic esterification, the entraining agent, which is usually isooctane, xylene, toluene or cyclohexane, is distilled off after the reaction is complete.

Starting component b1 is a monocarboxylic acid component, at least 60% by weight of which consists of one or more fatty acids which dry by oxidation and 40% by weight at most of which consists of one or more further monocarboxylic acids. Examples of suitable fatty acids include coconut oil fatty acid, soya oil fatty acid, safflower oil fatty acid, castor acid, dehydrated castor acid, peanut oil fatty acid, tall oil fatty acid or conjuene fatty acid. Examples of suitable further monocarboxylic acids include benzoic acid, tert.-butyl benzoic acid, hexahydrobenzoic acid, 2-ethylhexanoic acid, isononanoic acid, decanoic acid or octadecanoic acid. Soya oil fatty acid or a mixture of 70–100% soya oil fatty acid and 0–30% benzoic acid is preferably used as component b1.

Starting component b2 is a dicarboxylic acid component which consists of at least one (cyclo)aliphatic or aromatic dicarboxylic acid of molecular weight 116 to 600 or of the anhydride thereof. Examples of suitable dicarboxylic acids or anhydrides include adipic acid, succinic acid, succinic anhydride, sebacic acid, dimeric fatty acid, maleic acid, maleic anhydride, fumaric acid, isophthalic acid, terephthalic acid, phthalic acid, phthalic anhydride, tetrahydrophthalic acid, tetrahydrophthalic anhydride, hexahydrophthalic acid or hexahydrophthalic anhydride. Phthalic anhydride is preferably used as component b2.

Starting component b3 is a diol component which consists of at least one dihydric alcohol of molecular weight 62–2000. Examples of suitable diols of this type include ethylene glycol, 1,2- and 1,3-propylene glycol, neopentyl glycol, 2-butyl-2-ethylpropanediol, 1,3-, 2,3- and 1,4-butanediol, 1,5-pentanediol, 2,2,4-trimethylpenanediol, 1,6-hexanediol, diethylene glycol, triethylene glycol, dipropylene glycol, tripropylene glycol, hydrogenated bisphenols, 1,4- or other positionally isomeric cyclohexanediols, 1,4- or other positionally isomeric cyclohexanedimethanols, or the polyether polyols based on ethylene oxide and/or propylene oxide and/or tetrahydrofuran which are known in the art and which are obtained by the addition of the aforementioned alkylene oxides to bifunctional initiator compounds. Neopentyl glycol is preferably used as component b3.

Starting component b4 is a polyol component of higher functionality which consists of at least one tri- or polyhydric (preferably trihydric or tetrahydric) alcohol with a molecular weight ranging from 92–300. Examples of suitable alcohols of higher functionality include trimethylolpropane, glycerol or pentaerythritol. Trimethylolpropane and/or pentaerythritol are preferably used as component b4.

20–70%, preferably 45–60% of component b1, 10–40%, preferably 20–30% of component b2, 0–15%., preferably 0–10% of component b3 and 5–35%, preferably 20–30% of component b4 are used for the production of component b.

15–40%, preferably 20–30%-of component a, 60–90%, preferably 70–80% of component b, and 0–15%, preferably 0–10% of component c are used when carrying out the method according to the invention of producing urethane-modified polyester resins, wherein a+b+c add up to 100% in each case. Suitable catalysts, such as those which are known to one skilled in the art for speeding up the NCO—OH reaction, can be used to speed up the urethane-forming reaction and to achieve water-thinnable products. Examples thereof include tertiary amines such as triethylamine for example, organotin compounds such as dibutyltin oxide, dibutyltin dilaurate or tin bis(2-ethylhexanoate) or other organometallic compounds. Formation of the urethane is conducted in an 80 to 95% organic solution. Examples of suitable solvents which do not react with isocyanates include dimethyl diglycol, N-methylpyrrolidone, ethyl glycol acetate, butyl acetate, methoxypropyl acetate, xylene, toluene or solvent naphtha. After the urethane-forming reaction, small amounts of other solvents can be added to achieve defined properties. Examples thereof include ethanol, n-propanol, iso-propanol, n-butanol, iso-butanol, tert.-butanol, pentanol, hexanol, octanol, butyl glycol, ethyl glycol, butyl diglycol, ethyl diglycol, methyl diglycol or methoxypropanol.

Due to the increase in molecular weight and the increase in the number and concentration of urethane groups, the viscosity generally increases considerably during the formation of a polyurethane and results in stirring and mixing problems, particularly towards the end of the urethane-forming reaction. In a composition according to the invention, however, the viscosity of this molten resin towards the end of the urethane-forming reaction only increases to values which correspond to run-out times of 10–50 seconds as measured in a 40% solution in xylene in a DIN 4 cup at 23° C. The melt thus remains fluid at the temperature of reaction and can easily be stirred, even without special stirrer units.

The 80–95% solution of resin is then neutralised and is dispersed in water. At least partial neutralisation of the carboxyl groups can be effected in the organic phase before dispersion in water, after dispersion in water or during the dispersion process, e.g. by dispersing the solution of organic resin in a mixture of water and a neutralising amine. Neutralising agents are used in amounts such that the resin is converted into carboxylate groups by 0.5 to 1.2 equivalents (with respect to the carboxyl groups) of the base. Examples of suitable neutralising agents include alkali hydroxides, ammonia, dimethylamine, diethylamine, dipropylamine, dibutylamine, trimethylamine, triethylamine, tripropylamine, tributylamine, ethyldiisopropylamine, ethanolamine, diethanolamine, triethanolamine, N,N-dimethylethanolamine, N-methylethanolamine, N-methyldiethanolamine, isopropanolamine, diisopropanolamine, triisopropanolamine, N,N-dimethylisopropanolamine, morpholine, N-methylmorpholine, 2-amino-2-ethyl-1-propanol and mixtures of bases of this type. Ammonia, triethylamine or ethyldiisopropylamine are preferably used: the use of triethylamine is particularly preferred.

The urethane-modified polyester dispersions according to the invention can be used directly as lacquers or coating materials which dry by oxidative crosslinking at room temperature. Preferably, however, the customary adjuvant substances and additives which are known from lacquer technology are added to them, such as pigments, drying accelerators, skin prevention agents, thickeners, flow enhancers and anti-foaming agents. Some of these adjuvant substances can possibly even be added to the reaction batch during the production of the aqueous binder vehicles, unless the production process is thereby impaired. High-quality lacquers and coating compositions which dry by oxidative crosslinking even at room temperature are produced in this manner. They can be applied by methods which are known in the art, such as spraying, flooding, dipping, rolling, by doctor blade or by pouring or brushing, for example, to any desired substrates such as wood, paper, metal, plastics or glass. They are preferably used for the industrial lacquer-coating of metals.

The lacquers dry at room temperature or by forced thermal drying to form clear, crosslinked, glossy coatings.

The following examples serve to explain the invention without restricting it. All percentages are given as percentages by weight.

EXAMPLE 1

According to the Invention; Production of a Polyester Resin 211 g neopentyl glycol, 5710 g soya oil fatty acid, 1474 g benzoic acid, 2843 g pentaerythritol and 3239 g phthalic anhydride were weighed into a 15 liter reaction vessel fitted with a stirrer, a heater, and a water separator comprising a condenser, and were heated under nitrogen to 140° C. over 1 hour. The batch was heated to 160° C. over a further 2 hours, and an amount of xylene was added at 160° C. such that no sublimate solidified and a small degree of refluxing occurred, followed by heating to 220° C. over a further 6 hours. Condensation was effected at 220° C., with recycling of the xylene, until an acid number of 15 mg KOH/g was reached. The xylene was then distilled off at the same temperature until an acid number<5 was reached. The polyester resin which was thus obtained had an acid number of 4 mg KOH/ g and an OH number of 51 mg KOH/g.

EXAMPLE 2

According to the Invention; Production of a Polyester Resin 3522 g trimethylolpropane, 6631 g soya oil fatty acid and 3157 g phthalic anhydride were weighed into a 15 liter reaction vessel fitted with a stirrer, a heater, and a water separator comprising a condenser, and were heated under nitrogen to 140° C. over 1 hour. The batch was heated to 160° C. over a further 2 hours, and an amount of xylene was added at 160° C. such that no sublimate solidified and a small degree of refluxing occurred, followed by heating to 220° C. over a further 6 hours. Condensation was effected at 220° C., with recycling of the xylene, until an acid number of 15 mg KOH/g was reached. The xylene was then distilled off at the same temperature until an acid number<5 was reached. The polyester resin which was thus obtained had an acid number of 4.5 mg KOH g and an OH number of 56 mg KOH/g.

EXAMPLE 3

According to the Invention; Production of an NCO-functional Prepolymer 2223 g 1-isocyanato-3,3,5-trimethyl-5-isocyanatomethylcyclohexane (IPDI) and 4 g isophthaloyl dichloride were placed in a 5 liter reaction vessel at 50° C. fitted with a condenser, heater and stirrer. A mixture comprising 1180 g hydroxypivalic acid in 850 g N-methylpyrrolidone was then slowly added so that the temperature of the reaction mixture did not exceed 60° C. The batch was then held at this temperature until the desired or calculated NCO content was reached (after the consumption of all the OH groups, but not the carboxyl groups of hydroxypivalic acid). An NCO-functional prepolymer which had an NCO content of 9.9% and an acid number of 132 was obtained as an 80% solution in N-methylpyrrolidone. The product could be cooled and taken off or could be used directly for the production of the urethane-modified polyester resin.

EXAMPLE 4

According to the Invention; Production of an NCO-functional Prepolymer 1940 g 1-isocyanato-1-methyl-4(3)-isocyanatomethylcyclohexane (IMCI) and 3 g isophthaloyl dichloride were placed in a 5 liter reaction vessel at 60° C. fitted with a condenser, heater and stirrer. A mixture comprising 1180 g hydroxypivalic acid in 780 g N-methylpyrrolidone was then slowly added so that the temperature of the reaction mixture did not exceed 70° C. The batch was then held at this temperature until the desired or calculated NCO content was reached (after the consumption of all the OH groups, but not the carboxyl groups of hydroxypivalic acid). An NCO-functional prepolymer which had an NCO content of 10.6% and an acid number of 144 was obtained as an 80% solution in N-methylpyrrolidone. The product could be cooled and taken off or could be used directly for the production of the urethane-modified polyester resin.

EXAMPLE 5

According to the Invention; Production of a Urethane-modified Polyester Dispersion 1244 g of the NCO-functional prepolymer from Example 3 were introduced under an $N_2$ atmosphere into a 5 liter reaction vessel fitted with a condenser, heater and stirrer, and were heated to 80° C. 3000 g of the polyester from Example 2, which was heated to 50–70° C., 50 g trimethylpropane and 297 g triethylamine were then slowly added thereto. The batch was heated to 100° C. by utilising the heat generated by the exothemlic reaction, and was held at this temperature until NCO groups could no longer be detected.

The molten resin then had a viscosity of 16 seconds, determined as the run-out time of a 40% solution in xylene from a DIN4 cup at 23° C.

33 g of ethoxylated nonylphenol were then added, the batch was dispersed in about 3500 g water, treated with 50 g of concentrated Ascinin® skin-prevention agent (Bayer) and 500 g butyl glycol, homogenised, and adjusted with water and triethylamine to a viscosity of 2500 mnPas (D=40 $sec^{-1}$, 23° C.). The aqueous urethane-modified polyester resin which was obtained had an acid number of 44 mg KOH/g.

EXAMPLE 6

Comparison; Production of a Urethane-modified Polyester Dispersion 1126 g of a polyester with an OH content of 5.3% and an acid number of 3 mg KOH/g, consisting of 24.9% peniaerythritol, 6.8% phthalic anhydride, 7.6% isophthalic acid, 51.3% soya oil fatty acid and 9.5% benzoic acid, were introduced into a 4 liter reaction vessel fitted with a condenser, heater and stirrer, and were heated to 80° C. together with 87.5 g dimethylpropionic acid, 244 g N-methylpyrrolidone and 33 g triethylamine, followed by homogenising for 30 minutes. 286.5 g 1-isocyanato-3,3,5-isocyanatomethylcyclohexane (IPDI) were then added thereto with vigorous stirring, the batch was heated to 100° C. (utilising the heat generated by the exothermic reaction, and the mixture was held at this temperature until NCO groups could no longer be detected.

The molten resin then had a viscosity of 157 seconds, determined as the run-out time of a 40% solution in xylene from a DIN4 cup at 23° C.

14.4 g of ethoxylated nonylphenol were then added, the batch was dispersed in about 1400 g water, treated with 21.6 g of concentrated Ascining skin-prevention agent (Bayer), homogenised, and adjusted with water and triethylamine to a viscosity of 1100 mPas (D=40 $sec^{-1}$, 23° C.). The aqueous urethane-modified polyester resin which was obtained had an acid number of 27 mg KOH/g.

EXAMPLE 7

According to the Invention; Production of a Covering Lacquer Which Dried by Oxidation 296 g of the binder vehicle dispersion from Example 5, 1.5 g butanone oxime, 2.3 g Octasoligen Co 7 aqua (a 50% solution in water of a cobalt drier), 80 g of Bayertiitan® R-KB-6 titanium dioxide (Bayer) and 57 g of distilled water were ground to form a milled paste. This was subsequently mixed with 28 g butyl glycol and 1.1 g Byks 346 (Byk Chemie), and was adjusted with about 69.5 g of distilled water to a viscosity of about 90 seconds at 23° C. in a DIN4 flow-out cup. The solids content of the lacquer was 34%, and the pH was 8.9. After application to a degreased steel panel, the lacquer was dried at room temperature. After curing overnight, a defect-free lacquer film was obtained which exhibited a good level of properties.

What is claimed is:
1. A method of producing urethane-modified, aqueous polyester resins which dry by oxidative crosslinking and which have an acid number of 15–50 mg KOH/g, comprising the steps of reacting
   a) 15–40% by weight of a prepolymer which is produced in situ and which is the reaction product of
      a1) a diisocyanate component consisting of at least one organic diisocyanate of molecular weight range 168–294, and
      a2) hydroxypivalic acid,
   wherein the ratio of a1:a2 results in a starting equivalent ratio of NCO:OH=1:1 to 5:1,
   in 80–95% by weight organic solution with
   b) 60–90% by weight of a polyester resin with an OH number of 30–100 mg KOH/g and an acid number≦5 mg KOH/g, which is produced by the reaction of
      b1) 20–70% by weight of a monocarboxylic acid component, at least 60% by weight of which consists of at least one unsaturated fatty acid,
      b2) 10–40% by weight of a dicarboxylic acid, of a dicarboxylic anhydride or of a mixture of these compounds,
      b3) 0–15% by weight of one or more diols, and
      b4) 5–35% by weight of one or more polyols with an OH-functionality>2,
   wherein b1, b2, b3 and b4 add up to 100%, and
   c) 0–15% by weight of one or more polyols with an OH-functionality≧2,
   wherein a, b and c add up to 100%, subsequently dispersing the reaction product in water, and converting the carboxyl groups in the reaction product into carboxylate groups by adding 0.5–1.2 equivalents (with respect to the carboxyl groups present) of a base during the reaction of a+b+c or directly before, during or after the dispersion.
2. The method of claim 1 wherein
   a) 20–30% by weight of the prepolymer is used and the ratio of a1:a2 results in a starting equivalent ratio of NCO:OH=1.8:1 to 3:1,
   b) 70–80% by weight of a polyester resin is used with an OH number of 40–60 mg KOH/g, produced by the reaction of
      b1) 45–60% by weight of b1),
      b2) 20–30% by weight of b2),
      b3) 0–10% by weight of b3) and
      b4) 20–30% by weight of b4).
3. The method of claim 1 wherein the ratio of a1:a2 results in a starting equivalent ratio of NCO:OH=2:1 to 2.5:1.

4. The method of claim 1 wherein component a1) is 1-isocyanato-3,3,5-trimethyl-5-isocyanatomethylcyclohexane.

5. The method of claim 1 wherein polyester resin b is produced by the reaction of:
- b1) 45–60% by weight of a mixture of 70–100% by weight soya oil fatty acid and 0–30% by weight benzoic acid,
- b2) 20–30% by weight phthalic anhydride,
- b3) 0–10% by weight neopentyl glycol, and
- b4) 20–30% by weight trimethylolpropane, pentaerythritol or a mixture of these two polyols.

6. A coating composition comprising the reaction product of the method of claim 1.

* * * * *